United States Patent [19]

Miyazaki

[11] Patent Number: 4,865,471
[45] Date of Patent: Sep. 12, 1989

[54] SEAL ASSEMBLY FOR ROLLING BEARING

[75] Inventor: Hiroyuki Miyazaki, Yao, Japan

[73] Assignee: Koyo Seiko Co., Ltd., Osaka, Japan

[21] Appl. No.: 272,381

[22] Filed: Nov. 17, 1988

[30] Foreign Application Priority Data

Nov. 30, 1987 [JP] Japan .............................. 62-182335[U]

[51] Int. Cl.⁴ ............................................. F16C 33/78
[52] U.S. Cl. ...................................... 384/482; 277/95
[58] Field of Search ............... 384/482, 140, 513, 569, 384/481; 277/95

[56] References Cited

U.S. PATENT DOCUMENTS

| | | | |
|---|---|---|---|
| 4,505,484 | 3/1985 | Ohkuma et al. | 384/482 |
| 4,643,594 | 2/1987 | Neder et al. | 384/482 |
| 4,733,978 | 3/1988 | Colanzi et al. | 384/482 |
| 4,799,808 | 1/1989 | Otto | 277/95 |

*Primary Examiner*—Lenard A. Footland
*Attorney, Agent, or Firm*—Fleit, Jacobson, Cohn, Price, Holman & Stern

[57] ABSTRACT

A seal assembly for rolling bearing is comprised of: an inner race ring (3) of the rolling bearing which is formed in each of its external peripheral side faces with a stepped portion which consists of a first stepped section (4) having side and peripheral faces (41 and 42) thereof, and a second stepped section (5) located radially inwardly and axially outwardly of the first stepped section (4) and having side and peripheral faces (51 and 52) of itself; and, an outer race ring (1) of the rolling bearing which is provided on each of its side portions with an annular sealing member (7), each of said annular sealing member (7) has its outer peripheral portion fixed on the inner periphery of the outer race ring (1), and the inner peripheral portion of each annular sealing member (7) includes a seal lip (9) having an annular projection (10) which is formed on the internal side face of the inner peripheral portion of the seal lip (9), each of said annular projection (10) is held in contact with said side face (51) of the second stepped section (5), and the inner periphery (11) of each annular sealing member (7) faces toward the peripheral face (52) of the second stepped section (5) with a minute clearance therebetween.

1 Claim, 1 Drawing Sheet

SEAL ASSEMBLY FOR ROLLING BEARING

BACKGROUND OF THE INVENTION

This invention relates to seal assemblies for rolling bearings.

In the prior art, one type of seal assembly for rolling bearing has labyrinth seals which are provided on one of the two race rings and closely spaced apart from the other ring by the labyrinth gaps, while another type of seal assembly for the same has seals including seal lips which are equipped on one of the two race rings and slid on the other race ring.

The labyrinth seals of the seal assemblies of the above-said prior art have less efficiency of sealing as a matter of course, so that the lubricants can leak out of the rolling bearings and water and dust etc. can intrude into the bearings from the outside, whereby performance of the rolling bearings will be deteriorated.

On the contrary, the latter type including the seal lips slid on the race ring has high ability of sealing and still allows the race rings of the rolling bearing to provide for the low torque and high speed of rotation. However, obstructions, such as excessiveness of the torque and damages of the seal lips etc., will occur to the rolling bearing, when the temperature at which the rolling bearing is used is abruptly changed (cooled down from a high temperature), because the seal lip portions are always held in contact with the race ring by the needed contacting pressures, though which are low, with the result that the inner pressure of the rolling bearing becomes lower than the outer pressure in the event of the abrupt change of that temperature, by which depressurization the seal lips are more tightly compressed on the sliding contact surfaces of the race ring and vicinities thereof, which results in enlargement of the contacting areas of the seal lips accompanied with the excessiveness of the torque, and, in the worst case, results in the damages of the seal lips. If the seal lips have higher stiffness, the expansion of the contacting areas will be decreased, but, even with the small enlargement of the contacting areas, such impediments as the excess of torque and the damages of seal lips etc. should still arise.

Therefore, in order to permit the passage of air between the insides and outsides of the rolling bearings so as to dissolve the problem of the pressure changes in the rolling bearings, there has been proposed a seal assembly in which the seal lips are formed with airing slots within their sliding contact surfaces (See Japanese Patent Publication No. 44-19641), and there is another seal assembly in which ventilating openings are formed within the external peripheral surface of the seal and throughout the seal lip portions. However, these seal assemblies diminish the ability of sealing in the same way to the labyrinth seals, owing to the slots formed within the sliding contact surfaces of the seal lips or to the openings formed within the external peripheral surface of the seal and throughout the seal lip portions, so that the leakage of the lubricant out of the rolling bearings and the intrusion of water and dust etc. from the outside can occur again, thereby performance of the rolling bearings should be degraded.

SUMMARY OF THE INVENTION

It is the primary object of the present invention to provide a seal assembly for rolling bearing which preserves the efficiency of sealing without such obstructions as increment of the rotation torque and damages of the seal lips.

In accordance with this invention, the seal assembly for rolling bearing is comprised of; an inner race ring of the rolling bearing which is formed in each of its external peripheral side faces with a stepped portion which consists of a first stepped section having side and peripheral faces thereof, and a second stepped section located radially inwardly and axially outwardly of the first stepped section and having side and peripheral faces of itself; and, an outer race ring of the rolling bearing which is provided on each of its die portions with an annular sealing member, each of said annular sealing member has its outer peripheral portion fixed on the inner periphery of the outer race ring, and the inner peripheral portion of each annular sealing member includes a seal lip having an annular projection which is formed on the internal side face of the inner peripheral portion of the seal lip, said annular projection being in contact with said side face of the second stepped section.

Since the annular sealing members confine within the rolling bearing the lubricant supplied between the outer and inner race rings, with the aid of the annular projections of the seal lips held in sliding contact with the side faces of the second stepped sections, the lubricant can not leak out of the bearing during the relative rotation of both rings, at the same time water and dust can not enter the bearing from the outside.

As is often the case with the rolling bearing having the seal lips, depressurization in the bearing sometimes happens, thereby the seal lips are pushed toward the side faces of the stepped sections. However, the seal lips are still so retained that only or almost only the annular projections limitedly contact the side faces of the inner race ring, and thus the enlargement of the contact or, in more detail, of the internal contacting areas of the seal lips on the inner race ring is restrained, because the side faces of the first stepped sections are spaced axially inwardly away from the side faces of the second stepped sections.

BRIEF DESCRIPTION OF THE DRAWINGS

Other feature and advantages of the present invention will be apparent from the following description taken in connection with the accompanying drawings, wherein.

DESCRIPTION OF THE PREFERRED EMBODIMENTS

Embodiments of this invention will now be described by referring to the attached drawings.

Figure 1:
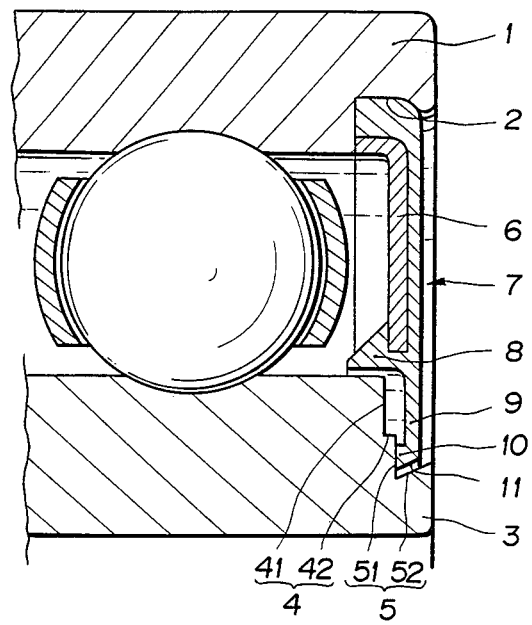
FIG. 1 is a sectional segmentary view of the seal assembly for rolling bearing in an embodiment of the invention.

In FIG. 1, outer race ring 1 of a rolling bearing is formed in each of the side faces of its inner periphery with a stepped portion 2. Inner race ring 3 of the rolling bearing is formed in each of the side faces of its outer periphery with a first stepped portion 4 having side face 41 and peripheral face 42 thereof, and with a second stepped portion 5 positioned radially inwardly and axially outwardly of the first stepped portion 4 and having side face 51 and peripheral face 52 of itself. Peripheral face 52 of the second stepped portion 5 is preferably a tapered surface having an increasing diameter toward the outside of the rolling bearing.

Annular sealing member 7 reinforced with core metal 6 is at its outer peripheral portion fixed on the stepped portion 2 of outer race ring 1. Annular sealing member 7 has a first seal lip 8 formed on the internal side surface of the middle part of the annular sealing member 7 and projecting toward the inside of the rolling bearing. The first seal lip 8 is an annular projection facing to the outer peripheral surface of inner race ring 3 with a minute clearance therebetween, thus defining a labyrinth. Further, the inner peripheral portion of annular sealing member 7 extending radially inwardly of the first seal lip 8 is in the form of a second seal lip 9, which engages the second stepped portion 5 of inner race ring 3.

The second seal lip 9 has an annular projection 10 which is held in sliding contact with the side face 51 of second stepped portion 5. The inner peripheral surface 11 of second seal lip 9 faces toward the peripheral face 52 of second stepped portion 5 with a minute clearance therebetween.

Side face 51 of second stepped portion 5 is preferably so sized as to permit only annular projection 10 to contact on it, thereby the internal side face of second seal lip 9 directly faces to side face 41 of first stepped portion 4 with a total spacing distance therebetween defined by the projecting length of annular projection 10 and the width of peripheral face 42 of first stepped portion 4, which spacing forms a labyrinth therein.

Side face 41 and peripheral face 42 of first stepped portion 4, suitably sized, can take effects of the step without decreasing the effect of labyrinth.

In addition, core metal 6 has its inside diameter which makes the inner periphery of core metal 6 reach not the second seal lip 9, but the first seal lip 8. Inner periphery 11 of second seal lip 9 has its width smaller than that of peripheral face 52.

In operation of the above-described seal assembly for rolling bearing, annular sealing member 7, having support of core metal 6, keeps its stiffness over the range between its fixed base portion and its first seal lip 8, and thus the first seal lip 8 is stabilized in place of inner ring 3. The second seal lip 9, having its elasticity, keeps its annular projection 10 compressed on side face 51 of second stepped portion 5 with a weak pressure.

The grease supplied between outer and inner race rings 1 and 2, or rather in the bearing is confined therewithin by annular sealing member 7, and does not leak out of the bearing during the relative rotation of both rings, thanks to the labyrinth of first seal lip 8 and to the annular projection 10 of second seal lip 9 retained in sliding contact with side face 51 of second stepped portion 5.

Further, water and dust coming from the outside into a labyrinth on peripheral face 52 are, on one hand, axially outwardly excluded by the centrifugal force produced by the peripheral face 52 which is a tapered surface spread out toward the outside, and, on the other hand, blocked by the annular projection 10 held in sliding contact with side face 51 not to enter the bearing.

Even in case that the second seal lip 9 is pushed toward side face 41 due to depressurization in the rolling bearing, the second seal lip 9 is still so retained that only or almost only annular projection 10 limitedly contacts the side face of inner race ring 3, and thus the enlargement of the contact or, in more detail, of the internal sliding area of the side face of second seal lip 9 on inner race ring 3 is restrained, because side face 41 is spaced axially inwardly away from side face 51.

In the seal assembly for rolling bearing according to this invention, the seal lips have low rigidity so as to make the pressures with which the seal lips are compressed on the inner race ring become low, thereby such obstructions as the excess of torque and the damages of the seal lips etc. are prevented, and thus the seal lips have high ability of sealing for that of the seal assembly. Furthermore, even in the event of the depressurization in the rolling bearing, the seal lips are still so retained that only or almost only the annular projections limitedly contact the side faces of the inner race ring, and thus the enlargement of the internal contacting areas of the side faces of the seal lips on the inner race ring is restrained, because the side faces of the first stepped portions are spaced axially inwardly away from the side faces of the second stepped portions. Consequently, such obstructions as the excess of torque and the damages of the seal lips etc. are prevented.

Figure 2:
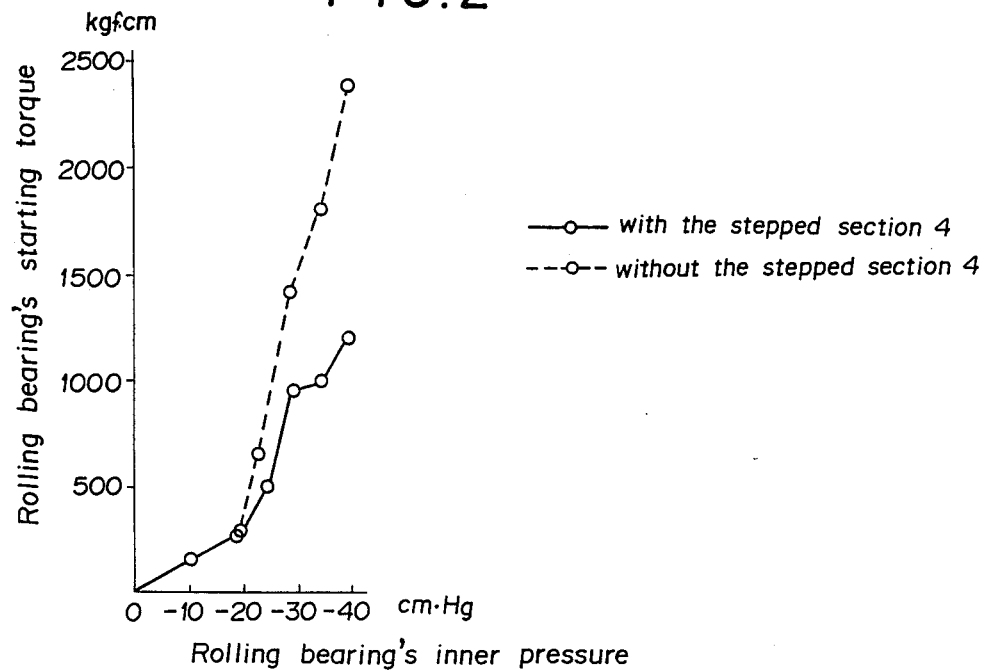
FIG. 2 is a graph showing the different correlations between the rolling bearing's inner depressurization and the rolling bearing's starting torque, obtainable from the rolling bearings having the stepped portions corresponding to the first stepped sections or having none of them.

Actually, the rolling bearings respectively having and not having the first stepped portions 4 were tested to obtain the respective correlations between the rolling bearing's starting torque and the rolling bearing's inner pressure, which torque is varied according to the depressurization in the rolling bearings and thus to the pressures with which the internal side faces of second seal lips 9 are compressed on the inner rings 3. The respective results compared with each other are shown in FIG. 2 (a broken line and a solid line respectively show them obtained without and with the first stepped portions 4.).

While the invention has been particularly shown and described with reference to preferred embodiments thereof, it will be understood by those skilled in the art that the foregoing and other changes in form and details can be made therein without departing from the spirit and scope of the invention.

I claim:

1. A seal assembly for rolling bearing comprising:
   an inner race ring of the rolling bearing which is formed in each of its external peripheral side faces with a stepped portion which consists of a first stepped section having side and peripheral faces thereof, and a second stepped section located radially inwardly and axially outwardly of the first stepped section and having side and peripheral faces of itself; and,
   an outer race ring of the rolling bearing which is provided on each of its side portions with an annular sealing member, each of said annular sealing member has its outer peripheral portion fixed on the inner periphery of the outer race ring, and the inner peripheral portion of each annular sealing member includes a seal lip having an annular projection which is formed on the internal side face of the inner peripheral portion of the seal lip, said annular projection being in contact with said side face of the second stepped section.

* * * * *